US009517388B2

(12) United States Patent
Idoni-Matthews et al.

(10) Patent No.: US 9,517,388 B2
(45) Date of Patent: Dec. 13, 2016

(54) ENERGY STORING DEVICE AND METHOD OF USING THE SAME

(75) Inventors: Jessica O. Idoni-Matthews, Wappingers Falls, NY (US); Julia Claire Silverman, Cambridge, MA (US); Victor Angel Mosti, New York, NY (US); Joel Manalo, Astoria, NY (US)

(73) Assignee: Uncharted Play, Inc., New York, NY (US)

( * ) Notice: Subject to any disclaimer, the term of this patent is extended or adjusted under 35 U.S.C. 154(b) by 604 days.

(21) Appl. No.: 13/565,474

(22) Filed: Aug. 2, 2012

(65) Prior Publication Data

US 2013/0023365 A1     Jan. 24, 2013

Related U.S. Application Data

(63) Continuation-in-part of application No. 12/592,991, filed on Dec. 7, 2009, now abandoned.

(Continued)

(51) Int. Cl.
*A63B 43/00* (2006.01)
*A63B 43/06* (2006.01)
(Continued)

(52) U.S. Cl.
CPC ............... *A63B 43/06* (2013.01); *A63B 43/00* (2013.01); *F03G 7/08* (2013.01); *A63B 43/04* (2013.01); *A63B 2220/12* (2013.01); *A63B 2220/53* (2013.01); *A63B 2220/58* (2013.01); *A63B 2220/833* (2013.01)

(58) Field of Classification Search
CPC . A63B 43/00; A63B 43/06; A63B 2071/0625; A63B 2071/063; A63B 2220/833; A63B 37/0003; A63B 2021/0054; A63B 2021/0055; F03G 7/08; H01L 41/113; H02J 41/113; H02N 2/18; H02N 2/186; H02N 2/188

(Continued)

(56) References Cited

U.S. PATENT DOCUMENTS 2,942,807 A    6/1960  Gallagher
4,248,010 A    2/1981  Fox
(Continued)

FOREIGN PATENT DOCUMENTS

GB          2308309 A    6/1997

OTHER PUBLICATIONS

International Search Report from PCT/US2012/049355, dated Oct. 26, 2012.

*Primary Examiner* — Lawrence Galka
(74) *Attorney, Agent, or Firm* — Whitmyer IP Group LLC (57) ABSTRACT

A ball includes a shell defining a spheroid. The shell includes an opening and a panel to close the opening. The panel has a sleeve that extends radially inward. A generation module is disposed in a cavity defined by the shell. The generation module includes a housing. A pendulum, an electric generator, and a battery are disposed in the housing. The pendulum is mechanically coupled to a rotor of the electric generator at a first axis of rotation of the pendulum and the electric generator is electrically coupled to the battery. An acceleration of the ball causes the pendulum to rotate about the first axis of rotation. The rotation of the pendulum rotates the rotor of the electric generator. The rotation of the rotor of the electric generator generates electricity, and at least a portion of the generated electricity is stored by the battery.

21 Claims, 9 Drawing Sheets

Related U.S. Application Data (60) Provisional application No. 61/521,826, filed on Aug. 10, 2011.

(51) Int. Cl.
*F03G 7/08* (2006.01)
*A63B 43/04* (2006.01)

(58) Field of Classification Search
USPC ....... 322/1; 310/10; 473/125, 351, 413, 467, 473/569, 570, 571, 577, 598, 607, 608; 320/100–167; 290/1–55; 482/1–148
See application file for complete search history.

(56) References Cited

U.S. PATENT DOCUMENTS

| | | | |
|---|---|---|---|
| 5,167,082 A * | 12/1992 | Chen | 36/2.6 |
| 5,228,686 A | 7/1993 | Maleyko | |
| 5,558,325 A * | 9/1996 | Hargis et al. | 473/606 |
| 6,117,030 A * | 9/2000 | Green, Sr. | 473/570 |
| 6,433,465 B1 | 8/2002 | McKnight et al. | |
| 6,572,492 B2 * | 6/2003 | Tinsman | 473/353 |
| 6,634,959 B2 | 10/2003 | Kuesters | |
| 6,893,141 B2 | 5/2005 | Mah | |
| 6,894,460 B2 | 5/2005 | Clingman | |
| 7,234,351 B2 | 6/2007 | Perkins | |
| 7,847,421 B2 * | 12/2010 | Gardner et al. | 290/1 R |
| 2002/0173378 A1 * | 11/2002 | Tinsman | 473/351 |
| 2003/0137274 A1 * | 7/2003 | Sastry | 320/101 |
| 2006/0232233 A1 | 10/2006 | Adams et al. | |
| 2007/0046251 A1 * | 3/2007 | Chi-Hsueh | 320/101 |
| 2007/0138793 A1 * | 6/2007 | Zimmerman et al. | 290/1 R |
| 2008/0097644 A1 | 4/2008 | Kaznov et al. | |
| 2008/0106149 A1 * | 5/2008 | Yen | 307/39 |
| 2008/0174281 A1 * | 7/2008 | Shau | 322/1 |
| 2009/0127856 A1 * | 5/2009 | Hench | 290/42 |
| 2010/0090477 A1 | 4/2010 | Keating et al. | |
| 2010/0130314 A1 | 5/2010 | Von Der Gruen et al. | |
| 2010/0167850 A1 | 7/2010 | Lin | |
| 2011/0193350 A1 * | 8/2011 | Rastegar et al. | 290/1 |
| 2012/0025531 A1 * | 2/2012 | Montgomery et al. | 290/53 |
| 2012/0133148 A1 * | 5/2012 | Romeo | 290/55 |
| 2012/0181989 A1 * | 7/2012 | Li et al. | 320/137 |
| 2012/0244969 A1 * | 9/2012 | Binder | 473/570 |

* cited by examiner

ENERGY STORING DEVICE AND METHOD OF USING THE SAME

CROSS REFERENCE TO RELATED APPLICATIONS

This application is a continuation-in-part of U.S. patent application Ser. No. 12/592,991 filed Dec. 7, 2009.

This application claims the benefit of U.S. Provisional Patent Application No. 61/521,826 filed on Aug. 10, 2011, the contents of which are incorporated herein by reference in their entirety.

FIELD OF THE INVENTION

The present invention relates to a ball having a generation module disposed therein. More specifically, the present invention relates to a soccer ball having a generation module disposed in a cavity of the ball, wherein the generation module generates electrical energy from the balls kinetic energy and stores that electrical energy.

BACKGROUND OF THE INVENTION

The total number of individuals in the World without electric power is put at about 1.5 billion, or a quarter of the world's population, concentrated mostly in Africa and southern Asia. See Nathanial Gronewold, One-Quarter of World's Population Lacks Electricity, Scientific American (Nov. 24, 2009). This "energy poverty" is a serious problem that has dire environmental, health, and economic consequences, especially for families in the developing world. With few other alternatives, households without reliable access to electricity often depend on pollutant kerosene lamps to provide extra hours of light after the sun goes down. The noxious fumes from the burning kerosene are bad for the environment and for respiratory health: just one night of exposure to the kerosene smoke is equivalent to smoking two packs of cigarettes. Furthermore, kerosene is expensive: a family can spend up to 30% of their income on kerosene each year. See Eva Rehfuess, *Fuel for Life: Household Energy and Health*, World Health Organization (Geneva: 2006). Further, there are now widely available technologies that can significantly improve the conditions of those people living in remote parts of the world, but these devices also require electricity to operate. For example, a farmer in a remote area can use a relatively inexpensive cellular phone to monitor market prices for her crops and to help decide when and where to harvest and sell her crops. This information can substantially increase the price offered for the product to the farmer, but only if the farmer has access to electrical energy to operate the cellular phone. With respect to both lighting and technological access, the lack of readily available electricity is a significant problem.

SUMMARY OF THE INVENTION

The present invention resides in one aspect in a ball. The ball includes a shell that defines a cavity. A generation module is disposed in the cavity and fixed relative to the shell. The generation module has a pendulum and an electric generator. The pendulum is coupled to the electric generator so that the electric generator converts a swinging of the pendulum to electrical energy.

In some embodiments of the present invention, a battery is electrically coupled to the electric generator and the battery stores electrical energy generated by the electric generator. The ball may further include a socket electrically coupled the battery and accessible from an outside surface of the shell.

In some embodiments of the present invention, the generation module further includes a rigid housing and the pendulum, the electric generator, and the battery are disposed in the rigid housing. In some embodiments, the pendulum is configured in the rigid housing so that a rotation of the pendulum is restricted about a first axis of rotation. The pendulum extends between a proximal end and distal end. A rotor of the electric generator is coupled to pendulum proximate to the first axis of rotation. The pendulum comprises a bob at or proximate to its distal end.

In some embodiments of the present invention, the pendulum is supported at the first axis of rotation by a first support and a second support. The first support is laterally displaced from the second support along the first axis of rotation. In yet further embodiments of the present invention, a rod of the pendulum and the bob extend in a plane perpendicular to the first axis of rotation from a point along said first axis of rotation between the first support and the second support. In some embodiments of the present invention, the pendulum is at least 20 grams. In yet further embodiments the pendulum is approximately 30 grams.

In some embodiments of the present invention, the electric generator is a 6 volt direct current motor and the battery is a 3.7 volt 800 mAh lithium-ion battery.

In yet further embodiments of the present invention, the shell includes a panel. The panel has a sleeve that extends radially inward from an inner surface of the panel. The generation module is secured inside the sleeve and the panel is secured in the shell. In some embodiments of the present invention the shell comprises ethylene vinyl acetate.

The present invention resides in other aspects in a soccer ball. The soccer ball includes a shell defining a spheroid having a cavity disposed therein. The shell includes an opening and a panel configured to substantially close the opening. The panel has a sleeve that extends radially inward from an inner surface of the panel. The soccer ball further includes a generation module disposed in the cavity and fixed relative to the shell. The generation module includes a housing. A pendulum, an electric generator, and a battery are disposed in the housing. The pendulum is mechanically coupled to a rotor of the electric generator at or proximate to a first axis of rotation of the pendulum and the electric generator is electrically coupled to the battery. An acceleration of the soccer ball relative to a playing surface causes the pendulum to rotate about the first axis of rotation. The rotation of the pendulum rotates the rotor of the electric generator. The rotation of the rotor of the electric generator generates electricity, and at least a portion of the generated electricity is stored by the battery.

DETAILED DESCRIPTION OF THE INVENTION

Figure 1:
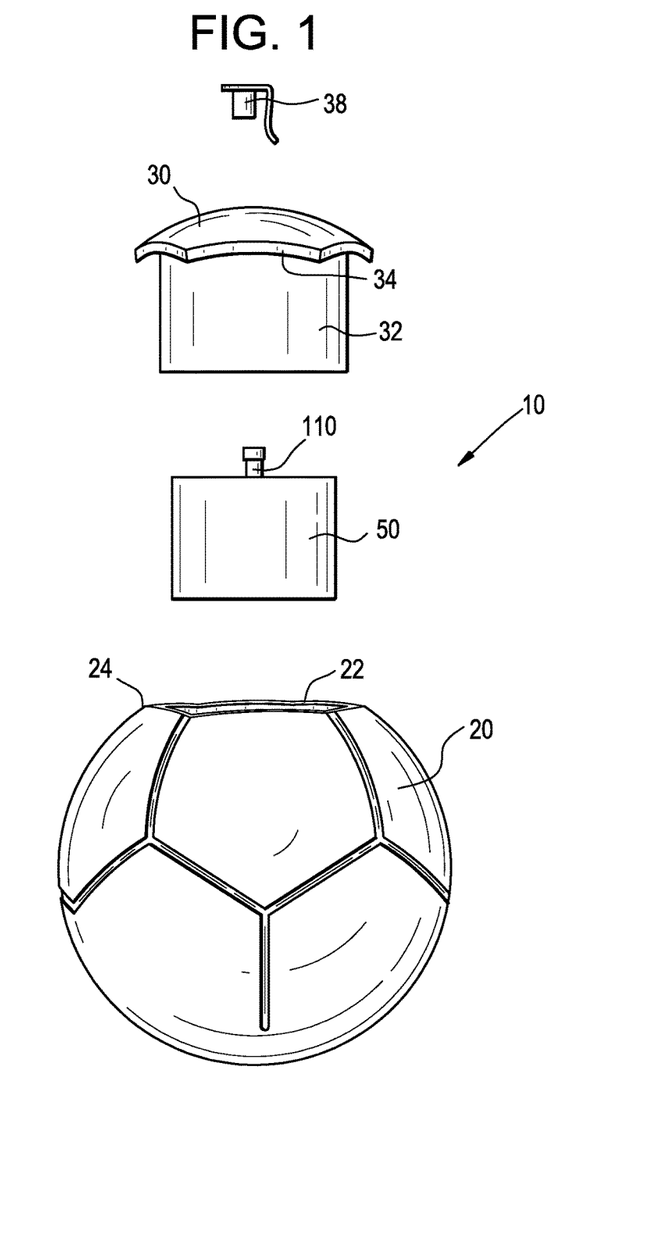
FIG. 1 is an exploded front view of a ball in accordance with one embodiment of the present invention.

In reference to the FIGS. generally and with specific reference to FIG. 1, a ball 10 in accordance with one embodiment of the present invention is shown. The ball 10 includes a generally spherical shell 20 that defines a cavity 22. The ball 10 includes a generation module 50 that harnesses kinetic energy of the ball 10 to generate and store electrical energy. The shell 20 defines an opening 24 for accessing the cavity 22 and includes a panel 30 for substantially closing the opening 24 defined by the shell 20. The panel 30 includes a cylindrical sleeve 32 that extends radially inward from an inner surface 34 of the panel 30. During assembly the generation module 50 is secured in the sleeve 32 and the panel 30 is secured in the opening 24 defined by the shell 20 so that the sleeve 32 is disposed in the cavity 22. A socket 110 is electrically coupled to the generation module 50 and is accessible through an opening (not shown in FIG. 1) defined by the panel 30. A cap 38 closes the opening defined by the panel 30 during recreational play with the ball 10 and the socket 110 is accessible from outside the ball when the cap 38 is removed from the opening defined by the panel 30.

In the embodiment shown, the shell 20 is generally spherical and has a diameter approximate to that of a standard soccer ball. The present invention, however, is not limited in this regard as the shell 20 may define different shapes. For example, the shell 20 may define a spheroid approximating the dimensions of an American football. Additionally the shell 20 may approximate a baseball, a basketball, or any other type of ball. The shell 20 is made from cross linked ethylene-vinyl acetate (EVA). The EVA is injection molded to form the spherical shape of the shell 20. In the embodiment shown, the shell 20 is approximately between 10 mm and 12 mm in thickness, although the present invention is not limited in this regard and the thickness of the shell 20 may vary from ball to ball or from location to location within a specific shell. Cross linked EVA and the specified selected thickness were selected to emulate the look and feel of a standard soccer ball without requiring a pressurized bladder disposed in the cavity 22 of the shell 20.

Figure 2:
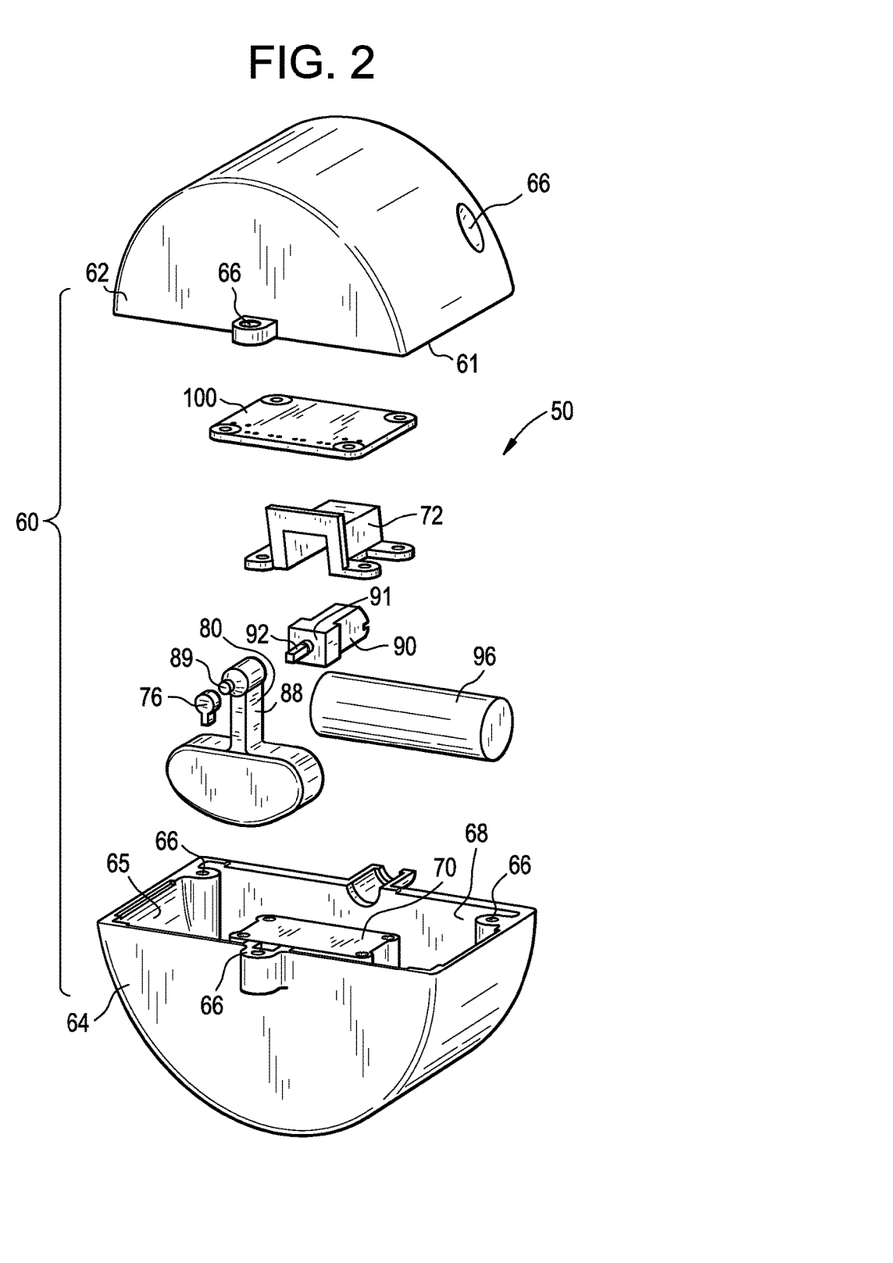
FIG. 2 is an exploded perspective view of a generation module shown in FIG. 1.
Figure 3:
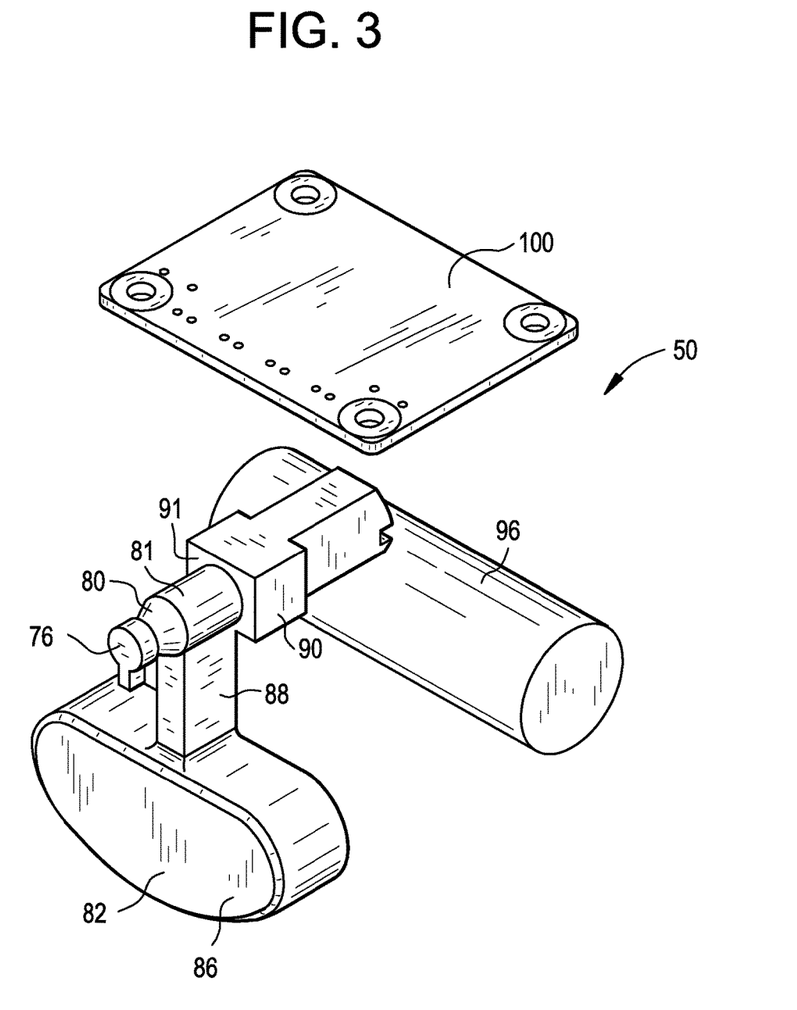
FIG. 3 is a partially exploded perspective view of a portion of the generation module shown in FIG. 1.

In reference to FIG. 2, an exploded view of the generation module 50 is shown. The generation module 50 includes a housing 60, a pendulum 80, an electric generator 90, a battery 96, and supporting hardware including one or more brackets and fasteners as discussed in detail below. The housing 60 includes a first section 62 and a second section 64. The first section 62 and the second section 64 are generally symmetrical and are secured together by one or more fasteners 63 (shown in FIG. 4) received through one or more holes 66 in the housing 60. The housing 60 defines a cavity 68 when the first section 62 and the second section 64 are secured together. The inner surfaces of the first section 62 and the second section 64 of the housing 60 are configured to receive and stabilize the pendulum 80, the electric generator 90, and the battery 96. In the embodiment shown, the housing 60 is manufactured by injection molding acrylonitrile butadiene styrene. It should be understood, however, that the present invention is not limited in this regard and, as can be appreciated by a person having ordinary skill in the art, different manufacturing techniques and materials may be employed. Acrylonitrile butadiene styrene was selected for the housing 60 because it secures and protects the internal components of the generation module 50 under high impact conditions experienced during use of the ball 10.

In the embodiment shown, the electric generator 90 comprises a 6 volt direct current motor with an 11:1 gear ratio. This gear ratio and motor were selected to optimize generation of electrical energy with a soccer ball. It should be understood that the type and gearing of the electric generator is not limited to this embodiment and a person of ordinary skill in the art familiar with this disclosure would recognize that different gearing and motor combinations may be used with the present invention. The electric generator 90 includes a rotor 92 extending from a surface 91 of the electric generator 90. Rotation of the rotor 92 operates the electric generator 90 causing it to generate electrical energy. Although a specific electric generator 90 is disclosed herein, the present invention is not limited in this regard and many different types of motors may be employed to convert rotational motion of the pendulum 80 to electrical energy. The electric generator 90 is mounted on pedestal 70 extending from an inner surface 65 of the second section 64 of the housing 60. A U-shaped bracket 72 is mounted over the electric generator 90 and to the pedestal 70 using a plurality of fasteners 74 (shown in FIG. 4) to secure the electric generator 90 to the pedestal 70.

Figure 8:
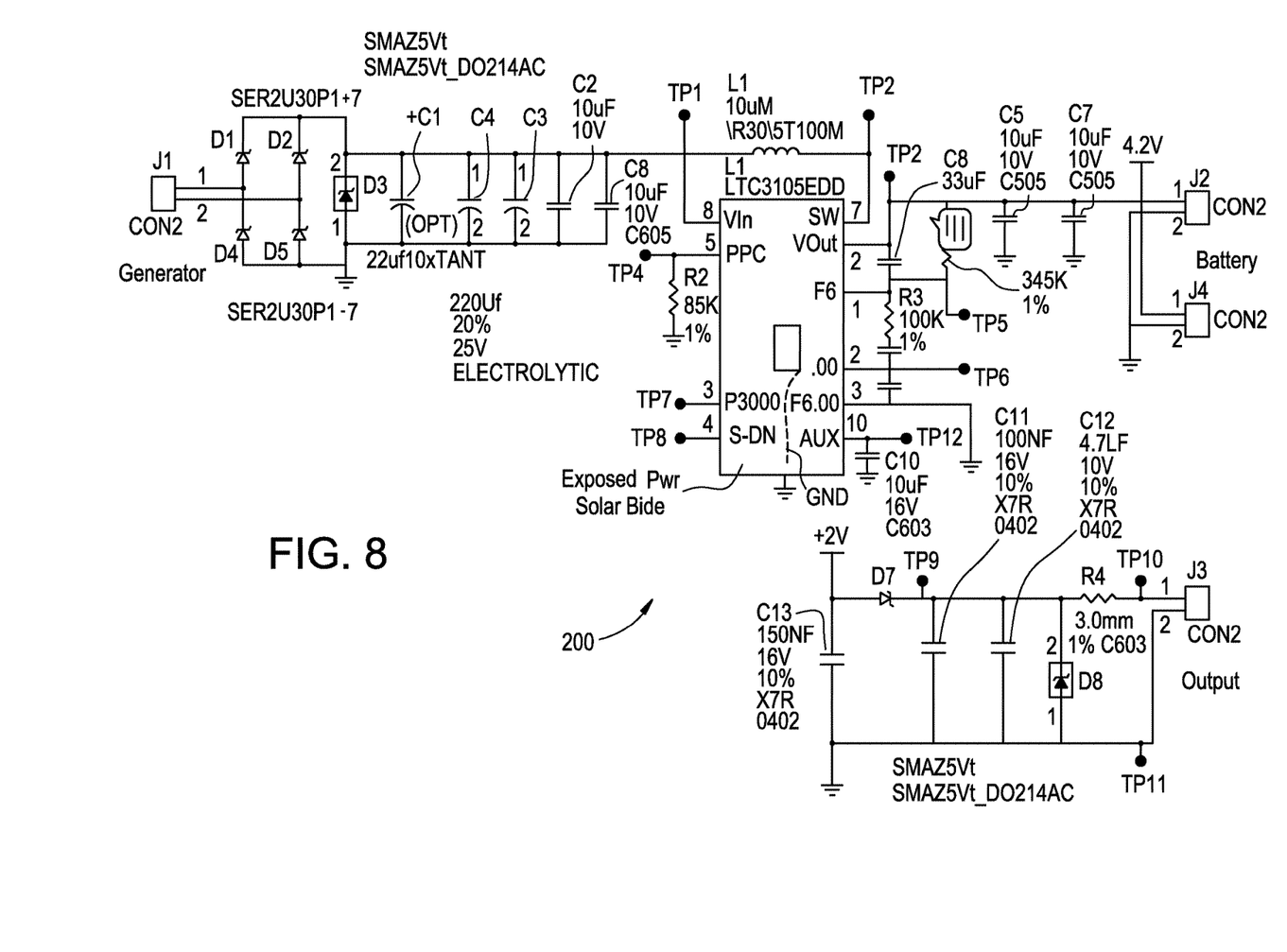
FIG. 8 is a wiring diagram of a printed circuit board in accordance with one embodiment of the present invention.

The battery 96 is disposed in the cavity 68 of the housing 60 and the battery 96 is in electrically coupled to the electric generator 90. In the disclosed embodiment, the electric generator 90 and the battery 96 are connected via a printed circuit board 100. The printed circuit board 100 is secured to a pedestal (not shown in the FIGS) extending from an inner surface 61 of the first section 62 of the housing 60. A circuit diagram 200 for the printed circuit board 100 in accordance with one embodiment of the present invention is shown in FIG. 8. Although a specific circuit diagram 200 for the printed circuit board 100 is shown in FIG. 8, the present invention is not limited in this regard and many different configurations may be employed. Some embodiments do not include a printed circuit board 100. In the embodiment shown, the battery 96 comprises a 3.7 volt 800 mAh lithium-ion battery, although many different configurations of batteries may be employed with the present invention. The battery 96 receives and stores at least a portion of the electrical energy generated by the electric generator 90.

Figure 4:
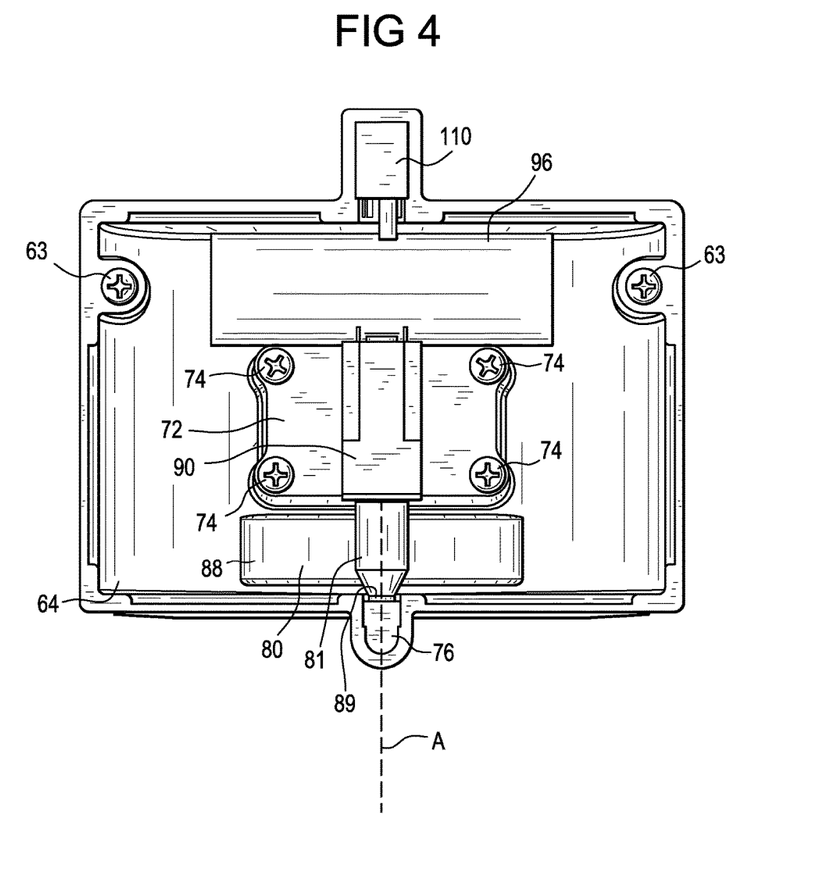
FIG. 4 is a top view of a portion of the generation module shown in FIG. 1.
Figure 5:
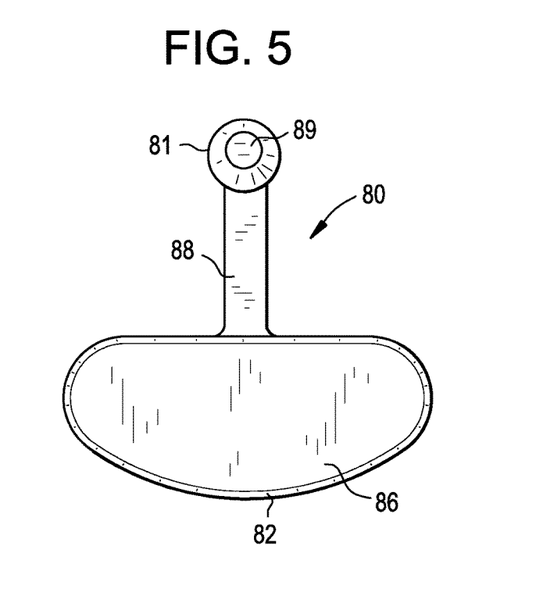
FIG. 5 is a side view of a pendulum shown in FIG. 2.

In specific reference to FIG. 5, the pendulum 80 includes a rod 88 that extends along a linear axis between a proximal end 81 and a distal end 82. The pendulum 80 rotates about a first axis of rotation A (shown in FIGS. 4 and 6) at or proximate to its proximal end 81. The axis of rotation A of the pendulum 80 is perpendicular to the rod 88. The pendulum 80 includes a recess (not shown in the figures) proximate to the proximal end 81 for receiving the rotor 92 of the electric generator 90. The recess is configured so that when the rotor 92 is received therein an axis of rotation of the rotor is coaxial with the first axis of rotation A. The rotor 92 may be secured in the recess of the pendulum 80 by any known method, including by a press-fit, an adhesive, or by a mechanical fastener. A portion of the pendulum 80 proximate to the proximal end 81 and laterally displaced from the recess along the first axis of rotation A of the pendulum 80 terminates in truncated cone 89 (shown in FIGS. 2 and 5).

Figure 6:
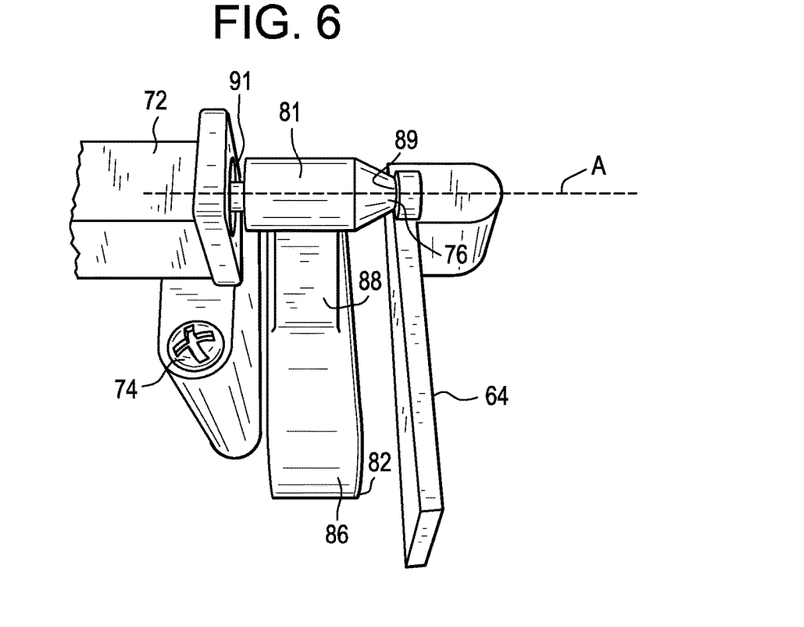
FIG. 6 is a top view of a portion of the generation module shown in FIG. 1.

In specific reference to FIGS. 4 and 6, the pendulum 80 is supported in the housing 60 by a first support and a second support. The first support is the rotor 92 being received in the recess of the pendulum 80 which is coaxial with the first axis of rotation A. The second support is a bearing 76 received in the housing 60. The truncated cone 89 is received in the bearing 76. This configuration of supporting the pendulum 80 limits the pendulum to the single axis of rotation A regardless of which direction the ball 10 is rotating during play. The housing 60 is configured so that the pendulum 80 can rotate completely about the first axis of rotation A. The pendulum 70 includes a bob 86 at or proximate to its distal end 82. In the embodiment shown, the pendulum 80 is die cast from zinc and is approximately 30 grams. The present invention is not limited in this regard as different materials and masses may be readily employed.

In reference to FIG. 4, the generation module 60 includes a socket 110 electrically coupled to the battery 96. The socket 110 extends from a portion of the housing 60 of the generation module 50. The socket 110 is accessible through the opening defined by the panel 30. A cap 38 closes the opening 36 defined by the panel 30 during play and the socket 110 is accessible from outside the ball 10 when the cap 38 is removed from the opening defined by the panel 30.

Figure 7:
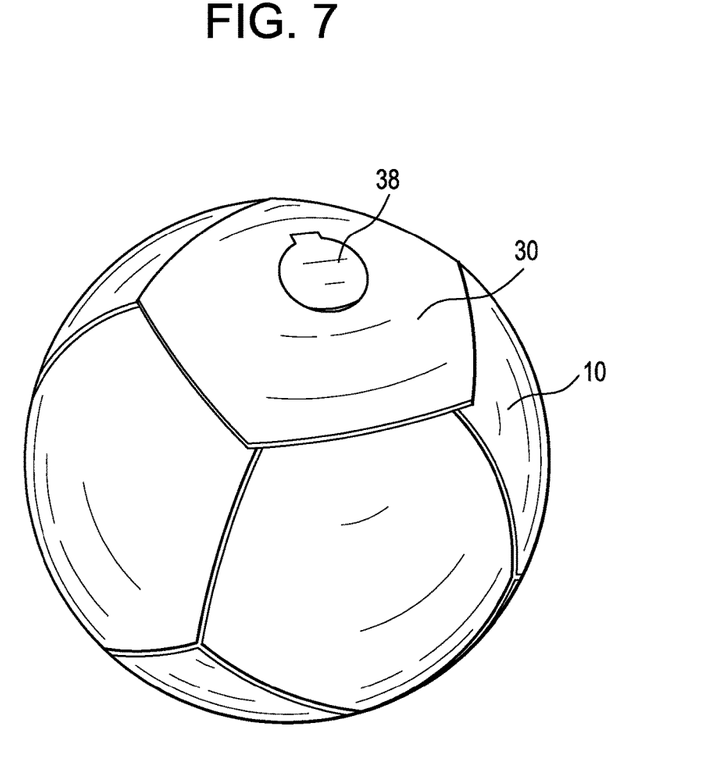
FIG. 7 is a front view of the ball shown in FIG. 1.

The generation module 50 is disposed in the cylindrical sleeve 32 that extends radially inward from the inner surface 34 of the panel 30. In the disclosed embodiment, the inside of the sleeve 32 has a similar profile as a cross section of the generation module 50 to facilitate disposal of the generation module in the sleeve. The generation module 50 is secured in the sleeve 32 using an adhesive, press-fit, and/or some other known method. In the embodiment shown, the adhesive comprises CA-SI-30 Cyanoacrylate. After the generation module 50 is secured in the sleeve 32 the sleeve is inserted through the opening 24 in the shell 20. As shown in FIG. 7, the panel 20 substantially closes the opening 24 in the shell 20. In the embodiment shown, the panel 30 is shaped as a pentagon to appear as a panel of the ball. In some embodiments of the present invention, the opening 24 and the panel 30 define a tongue and groove arrangement to provide a uniform closing of the opening 24 and to provide a smooth outer surface of the shell 10, especially at the point of transition between the outer surface of the panel 30 and the outer surface of the shell proximate to the panel 30. In some embodiments, the panel 30 is secured to an area of the shell proximate to the opening 24 using an adhesive of some other method known in the art. In the embodiment shown, the adhesive comprises CA-SI-30 Cyanoacrylate. This adhesive was selected because it provides good adhesion over time in a ball subject to stresses encountered during recreational use. In further reference to FIG. 7, a coating of paint may be applied to the outside surface of the shell 20 of the ball 10.

After assembly, a distal end of the sleeve 33 extends through the cavity 22 and contacts an opposite wall of the shell 20. In this manner, the sleeve 32 increases the rigidity of the ball 10. This is an important aspect in emulating the feel of a standard soccer ball with the ball 10 of the present invention, which unlike standard soccer balls does not include a bladder of pressurized air. It should be understood that the present invention is not limited in this regard, and that the sleeve may not extend to the opposing side of the shell 10. In yet further embodiments, the sleeve is not included in the design. In some embodiments, foam may be inserted into the cavity 22 of the shell 20 to further enhance structure of the ball 10.

During recreational use of the ball 10, the ball is accelerated relative to a playing surface for a period of time. These accelerations induce rotation of the pendulum 80 about the first axis of rotation A. This rotation is transferred to the rotor 92 by virtue of the connection between the pendulum 80 and the rotor 92. The rotor 92 rotates the electric generator 50 thereby generating electricity. At least a portion of this electricity is transmitted to and stored in the batty 96.

The electrical energy stored in the battery 96 can be accessed through the socket 110. The cap 38 is first removed and an electric cord compatible with the socket 110 is inserted therein. The electrical energy may be used to power a device that requires electricity for operation. For example, the electrical energy may be used to power a light, a telephone, a radio, etc. In some embodiments of the present invention, the electrical energy stored in the battery 96 can be used by a device included in the ball, for example, one or more lights or a global positioning system. In some of these embodiments, the ball 10 does not include a socket 110.

Figure 9:
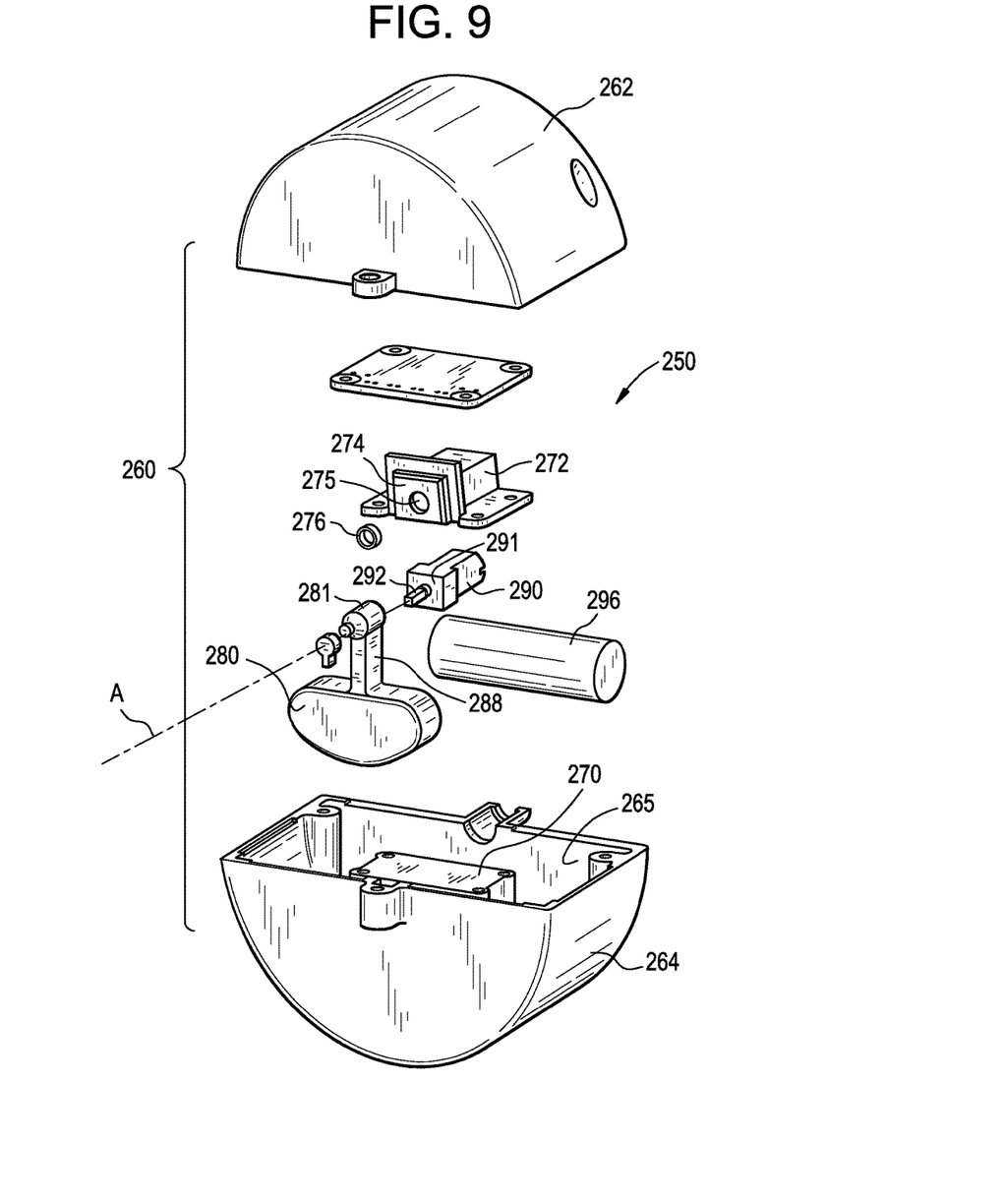
FIG. 9 is an exploded perspective view of a generation module in accordance with one embodiment of the present invention.

In reference to FIG. 9, an exploded view of a generation module 250 in accordance with one embodiment of the present invention in shown. The generation module 250 includes a housing 260, a pendulum 280, an electric generator 290, a battery 296, and supporting hardware including one or more brackets and fasteners as discussed in detail below. The housing 260 includes a first section 262 and a second section 264. The electric generator 290 is mounted on pedestal 270 extending from an inner surface 265 of the second section 264 of the housing 260. A U-shaped bracket 272 is mounted over the electric generator 290 and to the pedestal 270 using a plurality of fasteners (not shown in the FIG. 9) to secure the electric generator 290 to the pedestal 270. The electric generator 290 includes a rotor 292 extending from a surface 291 of the electric generator 290.

The pendulum 280 rotates about a first axis of rotation A at or proximate to a proximal end 281 of the pendulum 280. The first axis of rotation A of the pendulum 280 is perpendicular to a rod 288 of the pendulum 280. The pendulum 280 includes a recess (not shown in the figures) proximate to the proximal end 281 for receiving the rotor 292 of the electric generator 290. The recess is configured so that when the rotor 292 is received therein an axis of rotation of the rotor is coaxial with the first axis of rotation A. The rotor 292 may be secured in the recess of the pendulum 280 by any known method, including by a press-fit, an adhesive, or by a mechanical fastener. The rotor 292 is inserted through an opening 275 in a faceplate 274 of the U-bracket 272 and through a washer 276 before being inserted into the recess of the pendulum 280. The faceplate 274 and the washer 276 serve to maintain the pendulum 280 rotating about a single axis of rotation, the first axis of rotation A, regardless of the axis(es) of rotation of the ball. The faceplate 274 further inhibits radial forces from being transferred from the pendulum 280 to the electric generator 290 along the rotor 292.

Figure 10A:
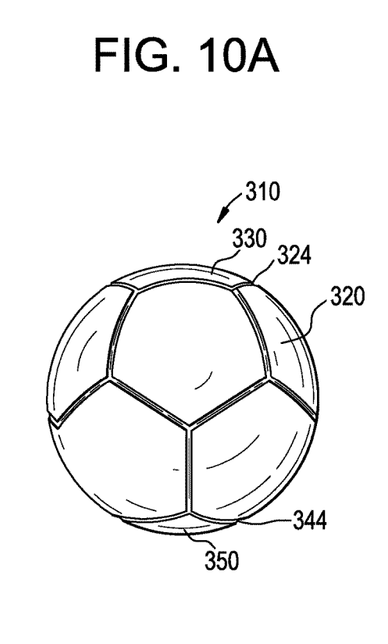
FIG. 10A is a view of a ball in accordance with one embodiment of the present invention.
Figure 10B:
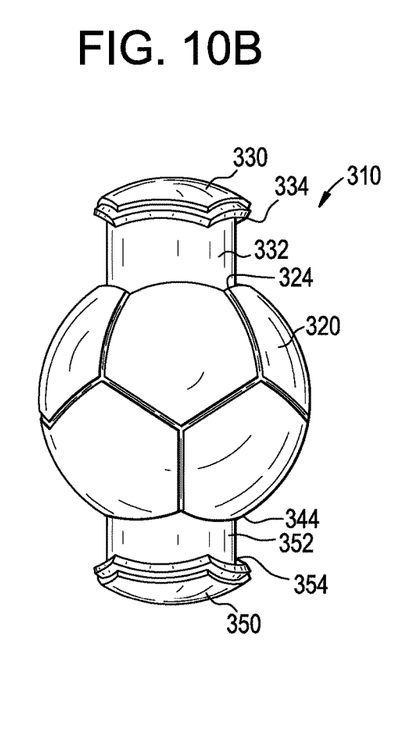
FIG. 10B is an exploded view of the ball shown in FIG. 10A.
Figure 10C:
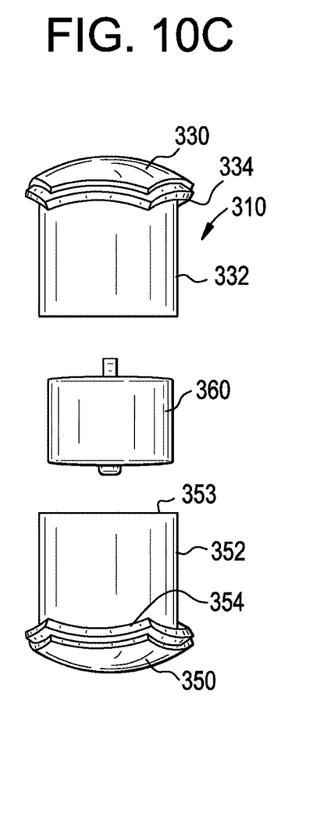
FIG. 10C is an exploded view of a portion of the ball shown in FIG. 10A.

In reference to FIGS. 10A-10C, a ball 310 in accordance with on embodiment of the present invention is shown. The ball 310 includes a generally spherical shell 320 that defines a cavity. The ball 310 includes a generation module 360 that harnesses kinetic energy of the ball 310 to generate and store electrical energy. The shell 320 defines a first opening 324 for accessing the cavity and includes a first panel 330 for substantially closing the first opening 324. The first panel 330 includes a cylindrical sleeve 332 that extends radially inward from an inner surface 334 of the first panel 330. The shell 320 defines a second opening 344 for accessing the cavity and includes a second panel 350 for substantially closing the second opening 344. In the embodiment shown, the second opening 344 is substantially opposite the first opening 324 in the shell 320. The second panel 350 includes a cylindrical sleeve 352 that extends radially inward from an inner surface 354 of the second panel 350.

During assembly the generation module 360 is secured in one or more of the first sleeve 332 and the second sleeve 353. The first panel 330 and the second panel 350 are secured in the respective first opening 324 and second opening 344 so that the first sleeve 332 and the second sleeve 352 are disposed in the cavity. In some embodiments, the first sleeve 332 is adapted to receive a distal portion 353 of the second sleeve 352 when the first sleeve 332 and the second sleeve 352 are fully inserted into the shell 320 thereby increasing the rigidity of the assembled ball 310. In yet other embodiments, a portion of the generation module 360 is received in the first sleeve 332 and a portion of the generation module is received in the second sleeve 352 when the first sleeve and the second sleeve are fully inserted into the shell 320 thereby increasing the rigidity of the assembled ball 310. One of the first and the second panel 330, 350 includes an opening for an outlet, however, the present invention is not limited in this regarding as there may be more than one outlet or no outlets.

Although the present invention has been disclosed and described with reference to certain embodiments thereof, it should be noted that other variations and modifications may be made, and it is intended that the following claims cover the variations and modifications within the true scope of the invention.

What is claimed is:

1. A ball, comprising:
   a shell defining a cavity;
   a generation module disposed in the cavity and fixed relative to the shell, the generation module having a pendulum and an electric generator, the pendulum coupled to the electric generator so that the electric generator converts a rotation of the pendulum to electrical energy;
   a battery electrically coupled to the electric generator;
   wherein the battery stores electrical energy generated by the electric generator;
   a socket disposed at least partially within the cavity and accessible from an outside surface of the shell, the socket electrically coupled to the battery and configured to transmit electrical energy from the battery to a device disposed externally relative to the ball, the device requiring electrical energy for operation.

2. The ball of claim 1, wherein the generation module further comprises a rigid housing, and the pendulum and the electric generator are disposed in the rigid housing.

3. The ball of claim 2, wherein the pendulum is configured in the rigid housing so that rotation of the pendulum is restricted to a first axis of rotation.

4. The ball of claim 3, wherein the pendulum extends between a proximal end and distal end;
   wherein a rotor of the electric generator is coupled to the pendulum at the first axis of rotation; and
   wherein the pendulum comprises a bob at its distal end.

5. The ball of claim 4, wherein the pendulum is supported by a first support and a second support; and
   wherein the first support is laterally displaced from the second support along the first axis of rotation.

6. The ball of claim 5, wherein a rod of the pendulum and the bob of the pendulum extend in a plane extending perpendicular to the first axis of rotation from a point along said first axis of rotation between the first support and the second support.

7. The ball of claim 6, wherein the pendulum is at least 20 grams.

8. The ball of claim 7, wherein the pendulum is 30 grams.

9. The ball of claim 8, wherein the electric generator comprises a 6 volt direct current motor.

10. The ball of claim 9, wherein the battery comprises a 3.7 volt 800 mAh lithium-ion battery.

11. The ball of claim 1, wherein the shell comprises a panel having a sleeve extending radially inward from an inner surface of the panel; and
    wherein at least a portion of the generation module is disposed in the sleeve.

12. The ball of claim 11, wherein the shell comprises ethylene vinyl acetate.

13. The ball of claim 1, wherein the electric generator comprises a motor and a gear ratio of the motor is greater than or equal to 5:1.

14. The ball of claim 13, where the gear ratio of the motor is 11:1.

15. A ball, comprising:
    a shell defining a spheroid and having a cavity disposed therein, the shell comprising an opening and a panel configured to close the opening, the panel having a sleeve extending radially inward from an inner surface thereof;
    a generation module disposed in the cavity and fixed relative to the shell, the generation module comprising:
       a housing;
       a pendulum, an electric generator, and a battery disposed in the housing, a rotor of the electric generator mechanically coupled to the pendulum at a first axis of rotation of the pendulum, the electric generator electrically coupled to the battery;
    wherein the generation module is configured such that an acceleration of the ball relative to a playing surface causes the pendulum to rotate about the first axis of rotation;
    wherein the generation module is configured such that the rotation of the pendulum rotates the electric generator which generates electrical energy, at least a portion of which is stored by the battery;
    a socket disposed at least partially within the cavity and accessible from an outside surface of the shell, the socket electrically coupled to the battery and configured to transmit electrical energy from the battery to a device disposed externally relative to the ball, the device requiring electrical energy for operation.

16. The ball of claim 15, wherein the generation module is secured in the sleeve of the panel.

17. The ball of claim 16, wherein the first panel is secured to the shell so as to close the first opening.

18. The ball of claim 17, wherein the shell comprises ethylene vinyl acetate.

19. The ball of claim 15, wherein the electric generator comprises a motor and a gear ratio of the motor is greater than or equal to 5:1.

20. The ball of claim 19, where the gear ratio of the motor is 11:1.

21. A system, comprising:
    a ball including a shell that defines a cavity, a generation module disposed in the cavity and fixed relative to the shell, the generation module having an electric generator and a pendulum coupled to the electric generator such that the electric generator converts a rotation of the pendulum to electrical energy, a battery electrically coupled to the electric generator of the generation module and configured to store electrical energy generated by the electric generator, and a socket disposed at least partially within the cavity and accessible from an outside surface of the shell, the socket electrically coupled to the battery; and a device that requires electrical energy for operation, the device disposed externally relative to the ball;

wherein the socket of the ball is configured to transmit electrical energy from the battery of the ball to the device.

* * * * *